United States Patent [19]
Ho

[11] Patent Number: 6,082,842
[45] Date of Patent: Jul. 4, 2000

[54] SEPARATE TYPE COMPUTER HOUSING SUPPORT FRAME STRUCTURE

[76] Inventor: Hsin Chien Ho, 20F-1, No. 268, Sec. 1, Wen-Hua Road, Pan Chiao City, Taipei, Taiwan

[21] Appl. No.: 09/026,431

[22] Filed: Feb. 19, 1998

[51] Int. Cl.[7] ............................................. H05K 7/18
[52] U.S. Cl. ............................ 312/257.1; 312/223.2; 312/350; 361/683
[58] Field of Search ........................... 403/363; 361/683; 312/223.2, 223.1, 334.5, 334.4, 257.1, 263, 334.23, 265.5, 265.6, 334.7, 334.28, 350, 352, 349; 52/800.1, 801.1, 801.11, 801.12; 220/4.02, 651, 653, 782; 411/508, 509, 510

[56] References Cited

U.S. PATENT DOCUMENTS

| | | | |
|---|---|---|---|
| 4,672,510 | 6/1987 | Castner | 361/686 |
| 4,802,321 | 2/1989 | Menchetti | 52/801.1 X |
| 5,164,886 | 11/1992 | Chang | 361/683 |
| 5,175,669 | 12/1992 | Navia et al. | 361/683 |
| 5,261,734 | 11/1993 | Speraw | 312/223.1 |
| 5,564,804 | 10/1996 | Gonzalez et al. | 312/223.2 |
| 5,706,559 | 1/1998 | Oliver et al. | 411/508 X |
| 5,785,401 | 7/1998 | Bowyer et al. | 312/334.7 X |

*Primary Examiner*—Janet M. Wilkens
*Attorney, Agent, or Firm*—Dougherty & Troxell

[57] ABSTRACT

A separate type computer housing support frame structure, in particular a support frame structure for horizontal type personal computers, including an independent and removable support frame, and an upper cover provided with a plurality of fastening blocks at a back side. The support frame is provided with open slots, fastening hooks disposed in the open slots, and a fastening hole. The support frame is engageable with or disengageable from the upper cover to provide a good support for the upper cover in supporting a monitor thereon and making available a completely open space when the upper cover is removed from the housing to facilitate assembly, expansion, or maintenance work.

4 Claims, 3 Drawing Sheets

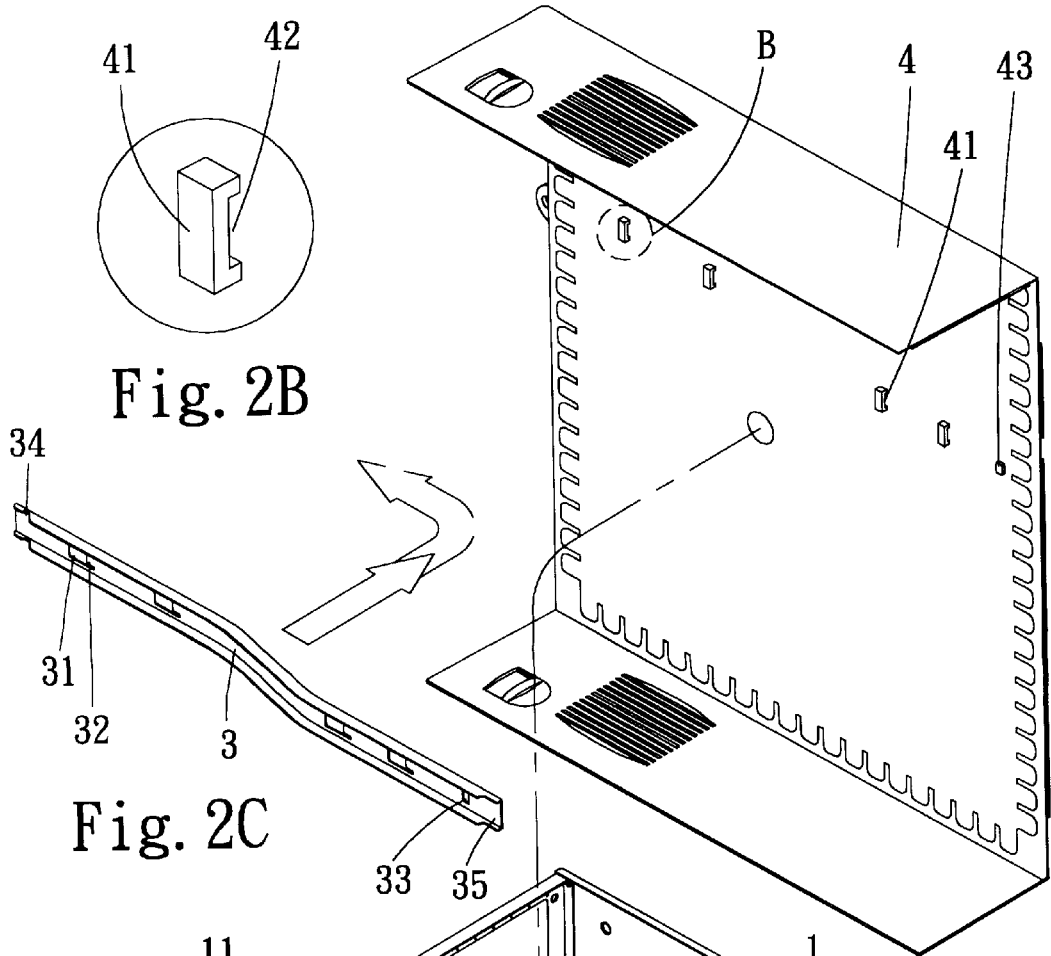
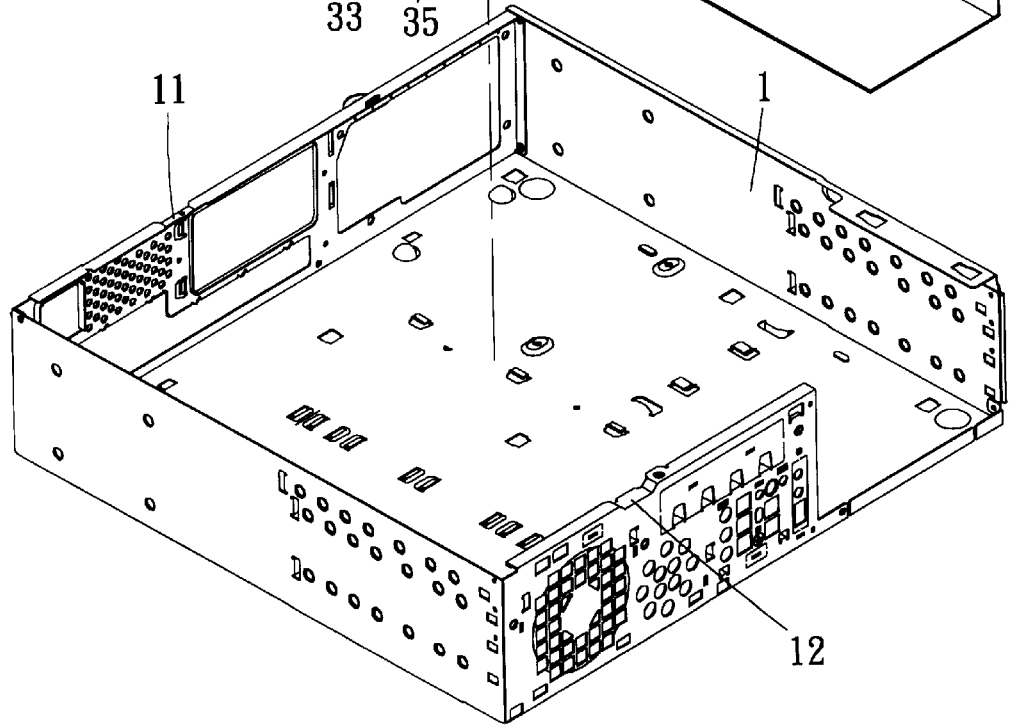

SEPARATE TYPE COMPUTER HOUSING SUPPORT FRAME STRUCTURE

BACKGROUND OF THE INVENTION (a) Field of the Invention

The present invention relates to a support frame structure for computer housings, and more particularly to a separate type computer housing support frame structure adapted especially for use on horizontal type personal computers.

(b) Description of the Prior Art

Main frames of personal computers in general may be placed horizontally or vertically. When the main frame is placed horizontally, a monitor may be placed on the upper side of the main frame. But since the outer cover plate of computer (which is conventionally pressed from metal but is injection molded from plastics in recent years) cannot bear the weight of the monitor, there is provided at the left side of a metal computer housing 1 a straddle type support frame referenced by the numeral 2 in FIG. 1 showing the prior art, the support frame being mounted at the left side because there is a disk drive support mounted at the right side of the housing 1 and the right side has a certain bearing force. The existence of the support frame 2 on the housing 1 makes assembly of components and parts of the computer main frame, expansion, and maintenance very inconvenient. Before every operation, the support frame 2 has to be removed by firstly loosening the screws. After assembly or maintenance, the support frame 2 has to be mounted in place again, which is not only inconvenient but also increases manufacturing costs.

SUMMARY OF THE INVENTION

Accordingly, a primary object of the present invention is to provide a separate type computer housing support frame structure to provide strength for horizontal personal computers, in which the support frame is coupled to an upper cover plate of the housing, the upper cover plate being provided with a plurality of fastening blocks which match fastening hooks and holes of the support frame such that the support frame may be separably assembled to the upper cover plate. In addition to providing good support for the housing in supporting a monitor placed thereon, the present invention makes it possible that there is a completely open space for operation after the upper cover of the housing is removed.

BRIEF DESCRIPTION OF THE DRAWINGS

The foregoing and other features and advantages of the present invention will be more clearly understood from the following detailed description and the accompanying drawings, in which.

FIG. 2A is a perspective outer view of a preferred embodiment of the present invention; and FIG. 2B is an enlarged perspective view of a fastening block in area B of FIG. 2A.

FIG. 2C is a perspective view of the support frame shown in FIG. 2A.

DETAILED DESCRIPTION OF THE PREFERRED EMBODIMENT

Figure 1:
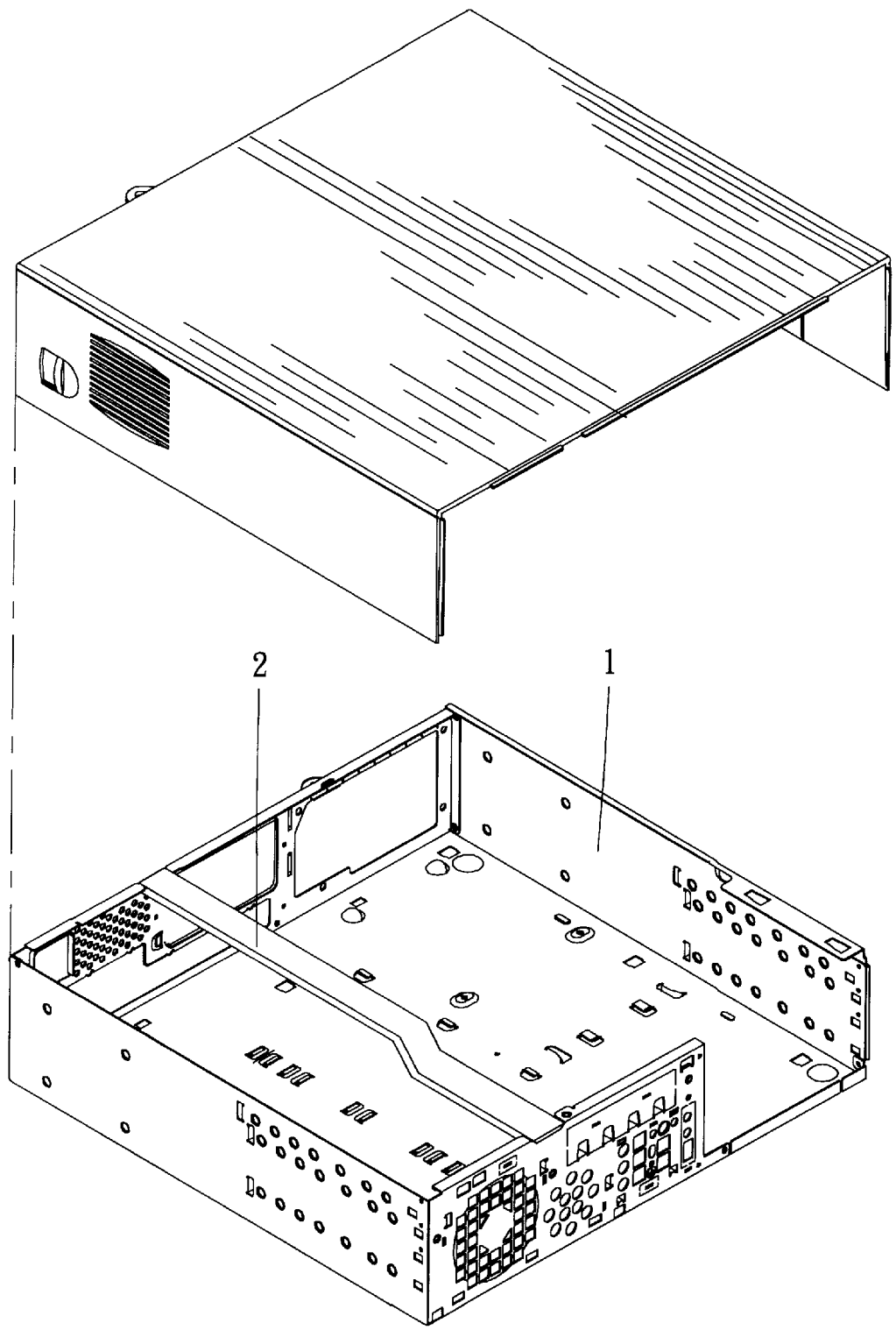
FIG. 1 is a perspective outer view of the support frame of the prior art.
Figure 3:
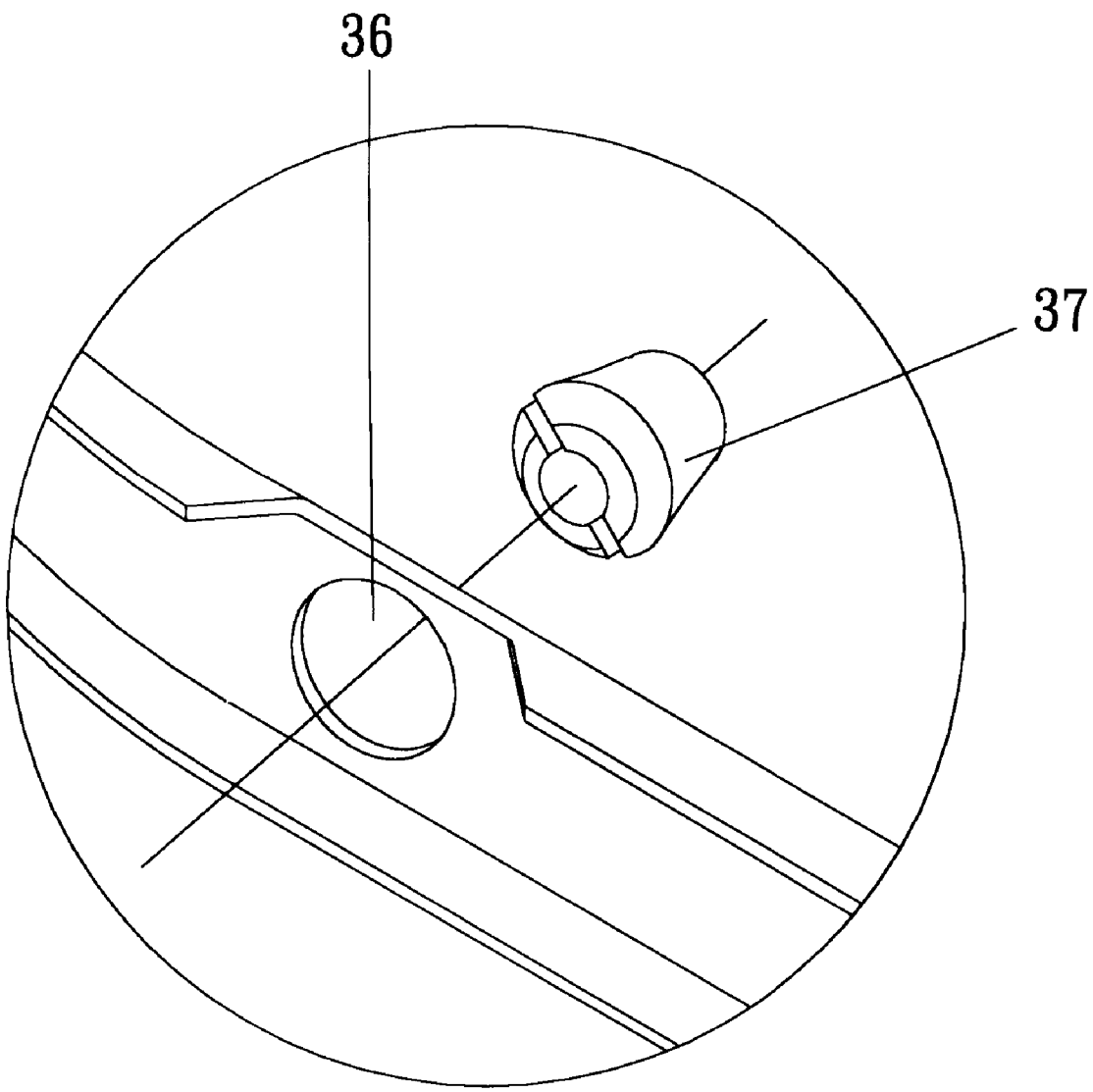
FIG. 3 is a perspective view of another preferred embodiment of the present invention.

As shown in FIG. 2, the upper sides of the front and rear edges of a metal computer housing 1 are respectively provided with recesses 11, 12 for placement of a removable support frame 3. The support frame 3 is designed to be separately removable to be engageable with or disengageable from an upper cover plate 4 of the housing 1. The upper cover plate 4 is provided with a plurality of fastening blocks 41 with respective grooves 42 on a back side thereof. The support frame 3 is provided with spaced elongate open slots 31 of a suitable length formed thereon, with fastening hooks 32 positioned in the open slots 31, and a fastening hole 33. The front and rear ends of the support frame 3 are respectively provided with respective notches 34, 35, a fastening hole 33 being further provided at near one end.

In assembling the support frame 3 to the upper cover plate 4, the open slots 31 of the support frame 3 are firstly aligned with the fastening blocks 4 of the upper cover plate 4 and are then fitted thereon. Next the support frame 3 is pushed rearwardly such that the fastening hooks 32 at one side of the open slots 31 engage the grooves 42 of the fastening blocks 41. At the same time, a projection 43 of the upper cover plate 4 provided to match the fastening hole 33 is inserted into the fastening hole 33 and positioned thereby, thus preventing the support frame 3 from free displacement once secured to the upper cover plate 4. When it is desired to remove the support frame 3, the above-described procedures are performed in a reverse order. After the support frame 3 is coupled to the upper cover plate 4, the notches 34, 35 at the front and rear ends of the support frame 3 are located in the recesses 11, 12 of the housing 1.

According to another embodiment of the present invention, the elongate open slots may be configured to be round holes 36, whereas the fastening blocks may be configured to be conical elastic fastening elements 37.

In summary, the separate type computer housing support frame structure according to the present invention not only provides the upper cover plate 4 with good support for supporting a monitor thereon but also makes a completely open space available after the upper cover plate 4 is removed from the housing 1, thereby allowing ample space for operation, expansion, assembly or maintenance purposes.

Although the present invention has been illustrated and described with reference to the preferred embodiment thereof, it should be understood that it is in no way limited to the details of such embodiment but is capable of numerous modifications within the scope of the appended claims.

What is claimed is:

1. A cover assembly for a computer housing having opposite upstanding walls, the cover assembly comprising:

a) a cover plate having two opposite depending side walls with front and rear edges extending between the two opposite side walls;

b) a support frame having opposite ends; and, c) at least one attaching device removably attaching the support frame to the cover plate such that the support frame is located between the depending side walls and the opposite ends are located substantially aligned with the front and rear edges of the cover plate.

2. The cover assembly of claim 1 wherein the at least one attaching device comprises:

a) at least one fastening block extending from the cover plate such that the at least one fastening block and the cover plate form a groove therebetween;

b) at least one elongated slot in the support frame configured such that the at least one fastening block extends therethrough; and, c) at least one fastening hook extending from the support frame and releasably engaging the groove so as to removably attach the support frame to the cover plate.

3. The cover assembly of claim 2 further comprising:
a) a fastening hole in the support plate; and
b) a projection extending from the cover plate and engaging the fastening hole.

4. The cover assembly of claim 1 wherein the at least one attaching device comprises:
a) at least one circular hole in the support plate; and,
b) at least one fastening block extending from the cover plate and engaging the at least one circular hole, the at least one fastening block comprising a conical elastic element increasing in cross-sectional dimension in a direction away from the cover plate.

* * * * *